(12) United States Patent
Lynghjem et al.

(10) Patent No.: US 7,490,472 B2
(45) Date of Patent: Feb. 17, 2009

(54) EFFICIENT COMBINED CYCLE POWER PLANT WITH $CO_2$ CAPTURE AND A COMBUSTOR ARRANGEMENT WITH SEPARATE FLOWS

(75) Inventors: Arne Lynghjem, Stavanger (NO); Jon Jakobsen, Sola (NO); Henrik Kobro, Stavanger (NO); Arnfinn Lund, Kvernaland (NO)

(73) Assignee: Statoil ASA, Stavanger (NO)

( * ) Notice: Subject to any disclaimer, the term of this patent is extended or adjusted under 35 U.S.C. 154(b) by 428 days.

(21) Appl. No.: 10/545,156

(22) PCT Filed: Feb. 9, 2004

(86) PCT No.: PCT/NO2004/000036

§ 371 (c)(1),
(2), (4) Date: Sep. 27, 2005

(87) PCT Pub. No.: WO2004/072443

PCT Pub. Date: Aug. 26, 2004

(65) Prior Publication Data

US 2006/0112696 A1     Jun. 1, 2006

(30) Foreign Application Priority Data

Feb. 11, 2003 (NO) ................... 20030682
Apr. 4, 2003 (NO) ................... 20031550

(51) Int. Cl.
   *F02C 1/00*     (2006.01)
   *F02C 3/30*     (2006.01)
   *F02C 7/08*     (2006.01)
   *F02C 7/12*     (2006.01)

(52) U.S. Cl. .................. 60/772; 60/775; 60/39.52; 60/806

(58) Field of Classification Search ................ 60/39.01, 60/772, 780, 782–784, 806, 39.52, 39.465
See application file for complete search history.

(56) References Cited

U.S. PATENT DOCUMENTS 2,787,121 A * 4/1957 Bouffart ................... 60/785

(Continued)

FOREIGN PATENT DOCUMENTS

WO     WO 00/57990 A1     3/2000

(Continued)

*Primary Examiner*—Michael Cuff
*Assistant Examiner*—Gerald L Sung
(74) *Attorney, Agent, or Firm*—Foley & Lardner LLP

(57) ABSTRACT

The invention relates to a method for inter alia to increase the energy and cost efficiency of a gas power plant or a thermal heat plant with $CO_2$ capturing. The power plant comprises gas turbine plants (12,12') comprising compressor units (13,13') and turbine units (14,14') and further comprises a combustor (10). The combustor (10) is working in principle with to separate gas part streams where one gas part stream flows internally through the flame tube (40) of the combustor (10), while the other gas part stream is flowing along the exterior of the flame tube (40). The first gas part stream comprises additional air and re-circulated, un-cleaned flue gas from the combustor (10), said gases being combusted together with fuel inside the flame tube (40). The second gas part stream comprises cleaned flue gas which is heated up at the exterior of the flame tube (40) while the flame tube (40) is cooled down. The invention comprises also a power plant, a combustor and a $CO_2$ capture plant.

20 Claims, 4 Drawing Sheets

U.S. PATENT DOCUMENTS

| | | | | |
|---|---|---|---|---|
| 3,618,576 | A | * 11/1971 | Dixon | 60/279 |
| 3,844,113 | A | * 10/1974 | Lockwood, Jr. | 60/39.15 |
| 3,866,411 | A | * 2/1975 | Marion et al. | 60/780 |
| 4,164,124 | A | * 8/1979 | Taylor et al. | 60/683 |
| 5,937,652 | A | 8/1999 | Abdelmalek | |
| 6,298,644 | B1 | 10/2001 | Sandei | |
| 6,360,524 | B1 | 3/2002 | Drnevich | |

FOREIGN PATENT DOCUMENTS

WO    WO 01/75277 A1    10/2001

* cited by examiner

EFFICIENT COMBINED CYCLE POWER PLANT WITH $CO_2$ CAPTURE AND A COMBUSTOR ARRANGEMENT WITH SEPARATE FLOWS

CROSS-REFERENCE TO RELATED PATENT APPLICATIONS

Norway Priority Application 2003 0682, filed Feb. 11, 2003 including the specification, drawings, claims and abstract, is incorporated herein by reference in its entirety. Norway Priority Application No. 20031550, filed Apr. 4, 2003 including the specification, drawings, claims and abstract, is incorporated herein by reference in its entirety. This application is a National Stage of U.S. Application PCT/NO2004/000036, filed Feb. 9, 2004, incorporated herein by reference in its entirety.

FIELD OF INVENTION

The present invention relates generally to a method for increasing the energy and cost efficiency of a gas power plant or a thermal power plant with a plant for $CO_2$ capture. The invention relates further to a gas power plant or a thermal power plant. In particular the invention relates to integration of one or more combined cycle gas turbines and a $CO_2$ exhaust gas cleaning plant, adapted to pressurized flue gas with enriched $CO_2$ content. The invention relates also to a modified combustor.

BACKGROUND OF THE INVENTION

During the last decades there has been a substantial global increase in the amount of carbon dioxide ($CO_2$) emission to atmosphere. According to the Kyoto agreement and based on the precautionary principle it is important to reduce the emission of climate gases such as $CO_2$ in order to counteract changes in climate. One way is to capture $CO_2$ when converting energy from fossil fuel in a gas power plant and/or thermal power plant. The different elements in the $CO_2$ value chain include technology for $CO_2$ capture, transportation of and finally final storage or exploitation of $CO_2$, for example for increased oil recovery from the oil reservoir (IOR).

The technology development within the field of $CO_2$ capture from combustion processes may be divided into three main categories, wherein the following feasible and useable technology is:

Removal of $CO_2$ prior to combustion (hydrogen power plant—Pre Combustion Type);
Removal of $CO_2$ subsequent to combustion (exhaust gas cleaning—Post Combustion Type), and
Stoichiometric combustion of natural gas and oxygen (oxy-fuel type).

Of the three main categories, the exhaust gas cleaning technology is the most developed technology, and there exists plants running on an intermediate scale. Exhaust gas cleaning has still a cost reduction potential and may most quickly be tested in a pilot plant.

The present technology for exhaust gas cleaning is based on absorption of carbon subsequent to combustion. A gas power plant of this type is disclosed in the prior art literature, textbooks and publications.

Emission of $CO_2$ may usually be reduced by 85-90% compared to a plant without any exhaust gas cleaning system. The exhaust gases from a standard combined cycle gas turbine plant contain ca. 3.5 volume % of $CO_2$ and the exhaust gas must be cooled down to normal operation temperature for amine washing, such temperature being approximately 40-44° C. In an atmospheric adsorption tower the $CO_2$ in the gas is transferred to the liquid phase by chemical absorption in the amine liquid. It is imperative to have a large area of contact between the gas and the liquid. Consequently, the tower may have to be as high as 30 metres or more. For a gas power plant of 400 MW the volume of exhaust gas to be cleaned is in the order of 2.500.000 $Nm^3/hr$, and the required cross sectional area of the absorption column will be 260-320 $m^2$.

In the regenerating plant the $CO_2$ is removed from the amine liquid by heating the mixture up to 120-125° C. Steam from the gas power plant is used both for heating, diluting and transportation of $CO_2$ out of the plant. Subsequent to cooling and condensation, $CO_2$ and water is separated, using a desorption column in order to obtain mass transfer from liquid to steam. The desorption column may have a height of ca. 20 metres and having a cross sectional area of 60-150 $m^2$.

The amine liquid solution may then be re-used for absorption subsequent to retrieval of heat from the liquid solution and reduction of the temperature. The desorption process produces a waste which has to be handled separately. For a 400 MW gas power plant said waste represents approximately 90-1500 tonnes/year, out of which 30-500 tonnes/year are amines, salts and organic carbon. The regeneration process requires substantial amount of energy, resulting in a reduction in efficiency of approximately 20% for a standard gas power plant producing electricity. A standard gas power plant having this type of exhaust gas cleaning means has thus the disadvantage that both investment costs and running costs are significantly high. In addition, such plants require large areas.

More cost effective $CO_2$ capture plants are known for other type of utilization, such as for example for $CO_2$ capture from a well stream from a natural gas field, e.g. the Sleipner field in the North Sea or from synthesis gas production. The operation of such plants are, however, subjected to completely different conditions of operation, i.e. higher pressure and/or higher $CO_2$ content, compared to exhaust gas cleaning from plants commonly operating at atmospheric pressure and with low $CO_2$ content of approximately 3.5 volume %.

In the North Sea there exists production platforms using an amine absorption plant and a desorption plant, but such $CO_2$ capturing plants are of a substantially smaller size, less costly and requiring less energy to operate.

Further it is known to use $CO_2$ membranes, for example of the polymer type, for pressurized well streams and process gases in plants, especially in USA. Said plants are even more energy- and cost effective. Contrary to the amine plants the $CO_2$ membrane plants require no liquid parts and consequently no regeneration of liquid, thereby avoiding the requirement for additional energy.

Another advantage is the feasibility of operating at a higher temperature, typical 40-100° C. in the $CO_2$ membrane plant. A certain leakage flow of $N_2$ may escape through the $CO_2$ membrane, and $N_2$ may be removed subsequent to being compressed to a pressure where $CO_2$ is transformed to liquid, allowing $N_2$ to be separated. In case of injection into an oil reservoir for increasing the oil recovery it may not necessary to separate $N_2$ and $CO_2$. In certain cases it may be advantageous to maintain a mixture of $N_2$ and $CO_2$ in order to increase oil recovery.

Capturing plants of the amine type for exhaust gas having $CO_2$ enriched content and/or at a higher pressure are disclosed in several documents, such as for example WO 95/21683 or WO 00/57900.

In order to obtain lower $NO_x$ emission from incinerators, it is proposed to recycle cooled flue gas by means of a booster fan back to the combustor.

SUMMARY OF THE INVENTION

An object of the invention is to provide a power plant from which emission of climate gases and detrimental gases from an environmental point of view, such as amines, salts, etc. is reduced to a minimum or eliminated.

Another object is to obtain more energy- and cost effective solutions and to reduce, preferably bisect, both costs of investment and cost of operation compared to state of art technology. It is of particular interest to arrive at energy effective solutions in which the temperature at the inlet of the turbine is as high as possible. In addition a favourable and improved heat transfer in the combustor is obtained, hence transferring the high-quality heat energy to that part of the gas stream which is led to the turbine.

It is also an object to obtain cost effective solutions for gas power plant, corresponding to the ones used for example for capturing $CO_2$ from the well stream from the natural gas field, by applying a new capturing means for exhaust gas with enriched volume of $CO_2$ and a higher pressure.

According to the invention the objects are obtained by using a method; a power plant and a combustor as further described in the in the encompassing claims.

According to the invention a more efficient power plant is obtained, where the emissions of $CO_2$ may be reduced by preferably 85-90%, although lower reduction, e.g. 0-90%, may be achieved.

Further, a more simplified plant, not requiring large areas or footprints compared to the prior art amine washing solutions, is achieved, mainly since the $CO_2$ membrane has a simplified construction and is not dependent upon a washing unit for separating $CO_2$ from the liquid. An effective exploitation of such $CO_2$ membrane solution, for example of the polymer type, for cleaning of flue gas requires that the flue gas both is pressurized and is enriched of $CO_2$.

A further advantage according to the invention is that the need for large gas-gas heat exchangers may be reduced or completely eliminated. It may be difficult to construct such large heat exchangers for temperatures exceeding 600 C.° without using cost extensive solutions and expensive materials.

According to the invention a cost effective heating in the combustor is achieved. Injection of steam in one of the gas streams prior to heating in the combustor may further contribute positively since the specific heat capacity of steam is higher than the heat capacity of air.

Further, injection of steam contributes substantially to maintaining the effect of the turbine at a high level by compensating for the volume of $CO_2$ removed in the $CO_2$ embrane plant. As a consequence of the invention the following is achieved:

Higher degree of efficiency due to higher temperature at the turbine inlet.

It is possible to separate $CO_2$ by means of a polymer membrane.

It is feasible to inject steam in one or more of the gas stream parts.

It is feasible to employ a semi-closed gas turbine cycle and a high $CO_2$ content, since the combustor may receive both compressed air and recycled flue gas, thereby achieving stable combustion of natural gas.

Produce low formation of $NO_x$ since the combustor receives both fresh air and recycled flue gas, thus working at an optimal combustion temperature.

BRIEF DESCRIPTION OF THE DRAWINGS

The invention will be described in details below, referring to the drawings, wherein.

DESCRIPTION OF THE EMBODIMENTS

Figure 1:
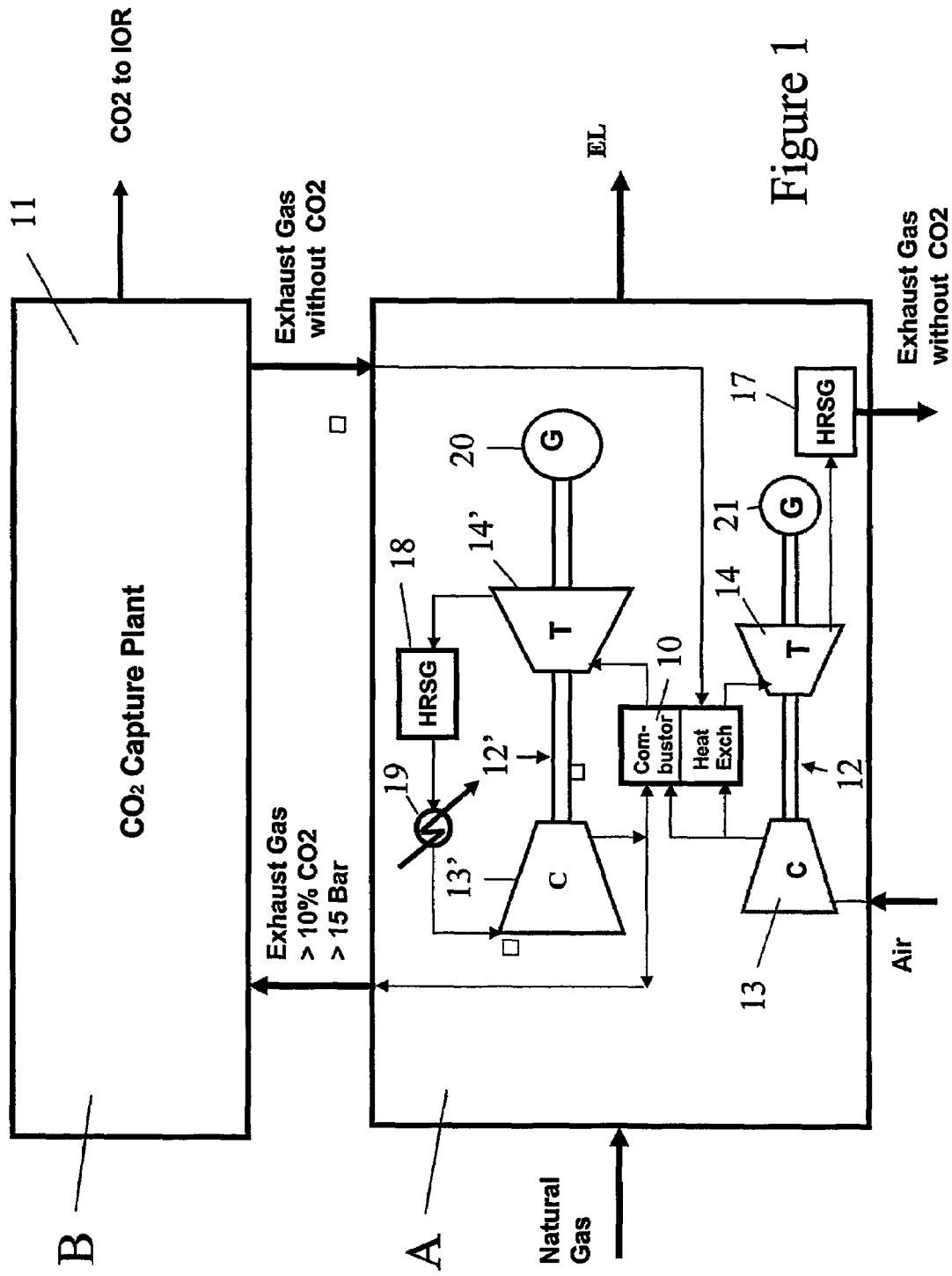
FIG. 1 shows a schematic diagram of the principle applied to a preferred embodiment of a gas power plant according to the invention, where the gas power plant is provided with a combustor employing separate gas streams according to the invention, the gas power plant being of the combined cycle gas turbine power plant (CCGT power plant)

The process shown in principle and in a schematic manner in FIG. 1 comprises a gas power plant or a thermal power plant based in principle on a power plant part A in the form of a combined cycle gas turbine plant and an integrated $CO_2$ capture plant B, for example a $CO_2$ membrane plant 11 intended to separate $CO_2$ from pressurized flue gas having $CO_2$ enriched content, delivered from the combustor 10. The $CO_2$ capture plant 11 may be of the amine system type.

Two integrated gas turbine plants 12,12' are used, depending on common combustor(s) 10 and operating in principle with two separate gas streams, one gas stream consisting of un-purified flue gas and one stream consisting inter alia of purified flue gas. The gas turbine plant 12' may for example be of the semi-closed type. The combustor 10 comprises a flame tube 40 and a surrounding casing or jacket 27. The combustor 10 and its manner of operation will be described in further detail referring to FIGS. 2-4.

One or more boilers or heat recovery steam generators (HRSG) 17,18 are included in the power plant part A, together with heat exchangers 19 and for example generators 20,21 for production of electricity.

As indicated in FIG. 1 natural gas is introduced into the plant together with air and produced, cleaned exhaust or flue gas, free of $CO_2$ while $CO_2$ and energy, for example in the form of electricity, is produced in the plant. The flue gas is led into the $CO_2$ capture plant 11 at a pressure equal to or larger than 15 bar and with a $CO_2$ concentration preferably exceeding 10%. The flue gas is discharged out of the plant A at least substantially clean of $CO_2$.

The $CO_2$ extracted in the $CO_2$ capture plant 11 may for example be used to increase oil recovery from a reservoir (IOR).

Figure 2:
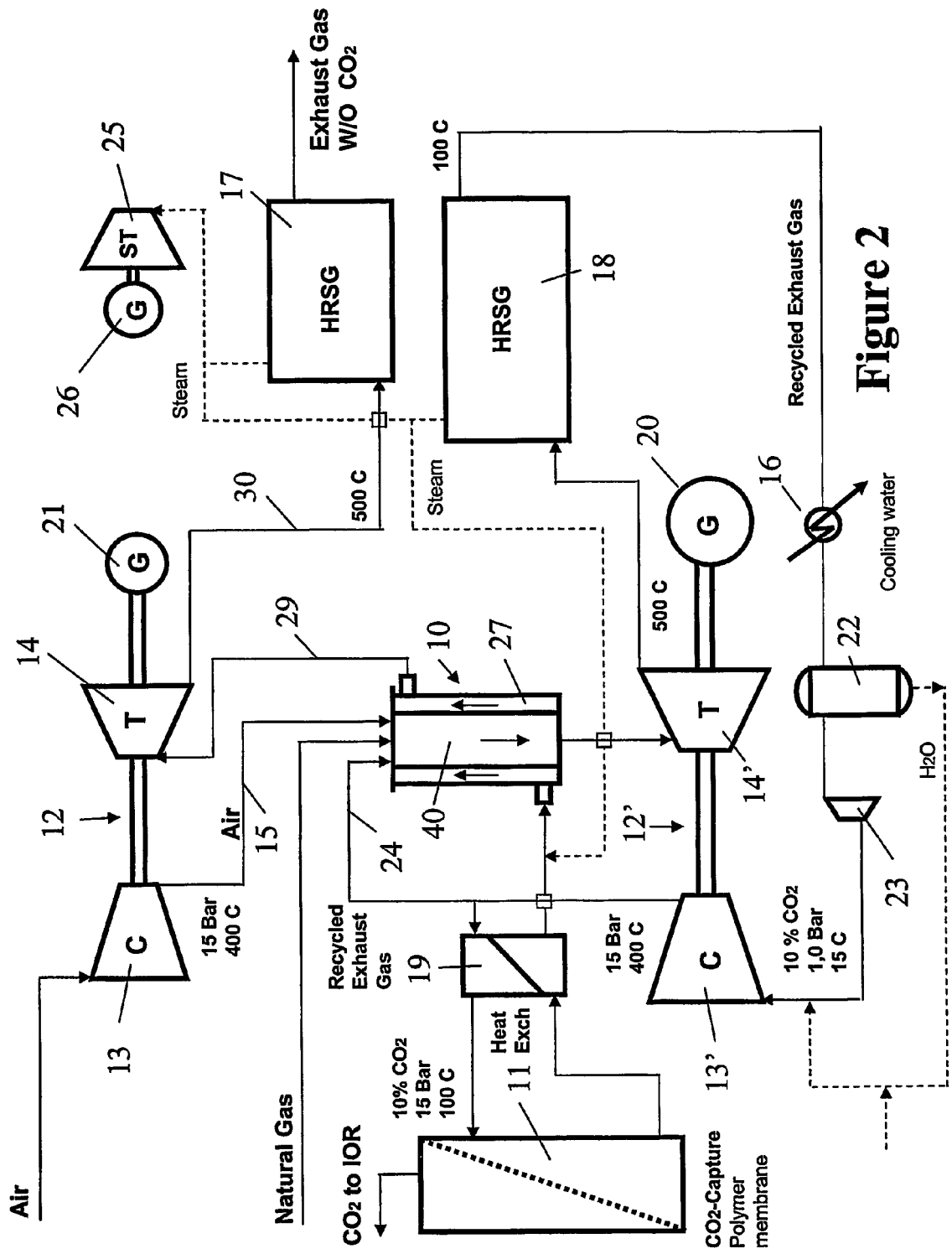
FIG. 2 shows a schematic diagram of the principle and an improved combustor plant according to the invention.

FIG. 2 shows a preferred embodiment of a combined cycle gas turbine plant and a $CO_2$ recovery plant 11. The gas turbine plant comprises a first gas turbine 12 comprising a compressor 13, a turbine 14 and a generator 21, operating on a common shaft. The compressor 13 delivers pressurized air to a flame tube 40 in a combustor 10 through a pipe 15. The air has a temperature of approx. 400° C. and has a pressure in the order of 15 bar. Further, fuel in the form of natural gas is injected into the flame tube 40. The flue gas from the flame tube 40 drives the turbine 14' of a second gas turbine 12'. The temperature of the flue gas leaving the combustor 10 may typically be in the order of 1200-1400° C., such temperatures being common inlet temperature for turbines of advanced gas turbines. For such solutions it is preferred that the distance between the combustor 10 and the inlet of the turbine 14' is short, thereby reducing the use of expensive high temperature resistant materials. Reference is made to FIGS. 1 and 2.

From the turbine 14', the flue gas having a temperature in the order of 500° C., is fed to a heat recovery steam generator 18 in which the flue gas is cooled down. The flue gas leaves the heat recovery steam generator 18 at a temperature in the order of 100° C. and is led to a water cooler 16, a means for separating out water 22 and a booster or a compressor unit 23, whereupon the pressurized flue gas is led to the inlet of the compressor 13' of the second gas turbine 12', compressing flue gas. The water separated out in the water separator 22 is then reintroduced in the gas stream from the booster 23 in order to regulate the mole weight of the gas at the inlet of the compressor 13'. If too little or too much water is separated in the water separator 22, water may be removed or added from an external source (not shown).

After the compressor 13' the pressurized flue gas is split into two part streams, one part stream going via a simple heat exchanger 19 to the $CO_2$ capture plant 11. The cleaned flue gas is led back via the heat exchanger 19 and into the jacket 27 surrounding the flame tube 40. After the cleaned flue gas having circulated through the jacket 27 the flue gas is led to the turbine 14 of the first gas turbine 12 through the pipe 29. This gas flow has a typical temperature of approximately 800-1000° C. or higher. From the turbine 14 the cleaned flue gas is led through a pipe 30 to a second heat recovery steam generator 17 for production of steam by means of the heat recovered from the cleaned flue gas, prior to discharging the flue gas to the atmosphere.

The second gas stream from the exit of the compressor 13' of the second gas turbine 12' is re-circulated through a recirculation pipe 24 back to the inlet of the combustor 10 and into the flame tube 40 together with fuel and air from the compressor 13 of the first gas turbine 12. The object of the re-circulation is to increase concentration of flue gas optimally before feeding the $CO_2$ enriched flue gas to the $CO_2$ membrane plant 11.

The steam from the heat recovery steam generators 17 and 18 drives a steam generator 26. In addition the heat recovery steam generator(s) 17,18 supply steam which is introduced into the cleaned flue gas upstream of the inlet to the jacket 27 surrounding the flame tube 40. The steam is introduced in order to compensate for the loss of volume caused by the removed $CO_2$. Steam may in addition or as an alternative be delivered as energy to an industrial plant.

Figure 3:
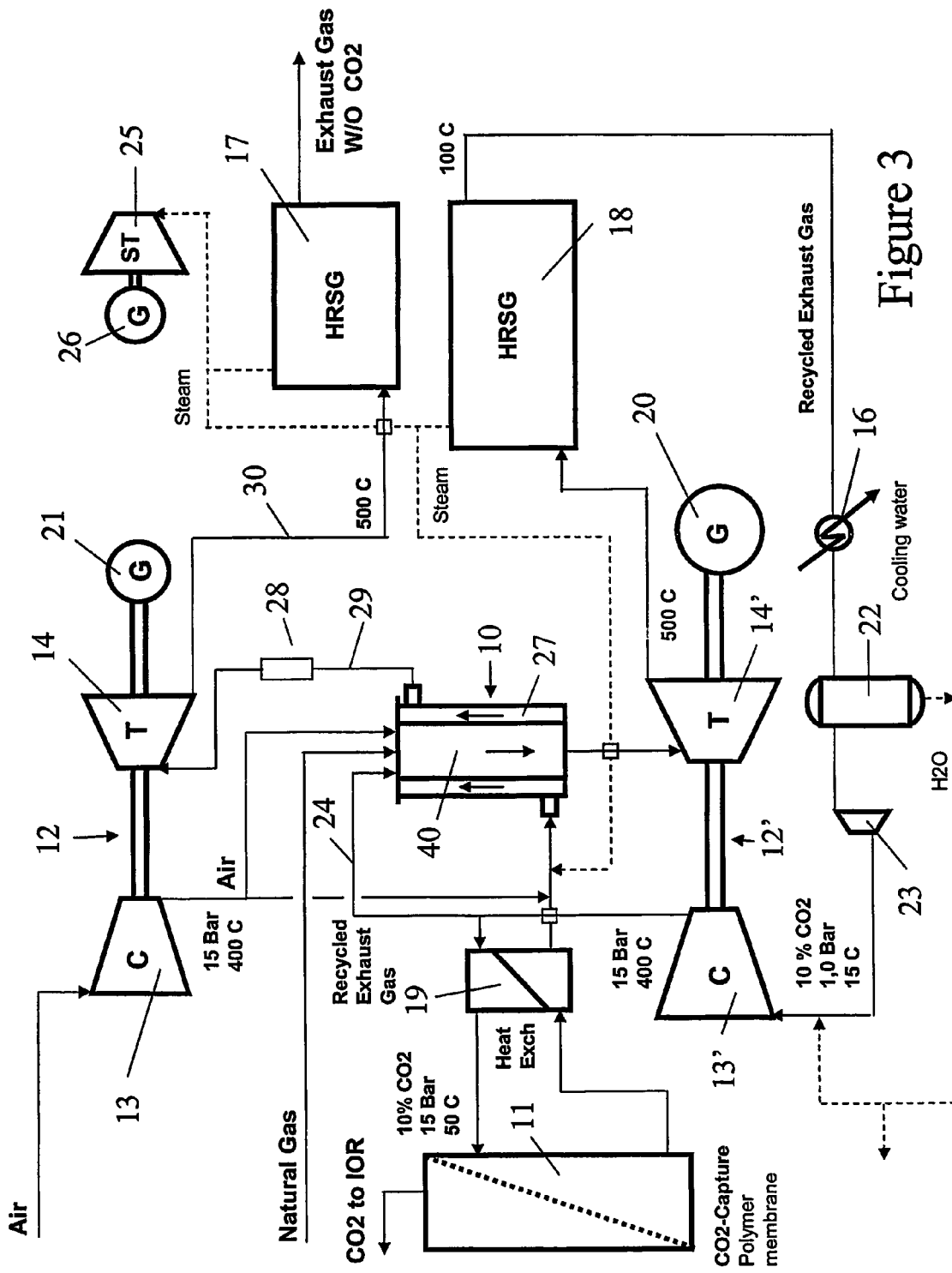
FIG. 3 shows a preferred further embodiment of the principle and an improved combustor plant according to the invention.

FIG. 3 shows a corresponding solution to the embodiment shown on FIG. 2, the main and only difference being introduction of a unit for additional heating 28 into the pipe 29 after the exit from the jacket 27 and before the inlet to the turbine 14 in the first gas turbine plant. The unit for additional heating 28 is for example obtained by combustion of natural gas. Such unit for additional heating 28 increases the temperature of the cleaned flue gas from a typical temperature of approx. 800° C. or higher up to approx. 1200-1400° C. This will enhance the efficiency of the plant, but may reduce the degree of removed $CO_2$ from the power plant.

According to the embodiment shown in FIGS. 1-3 two different gas turbine plants with respect to output effect are employed, for example in the ratio 1:3. Other ratios may also be employed. Alternatively gas turbine plants having the same ratio may be employed, i.e. that any ratio between 1.3 and 1.1 with respect to output effect may be used. On the other hand, the other gas turbine parameters, such as for example the pressure ratio, should be approx. 1:1. Since gas turbine plants available on the market only are of standard models with respect to design and output effect, the process shown in FIG. 3 may be adjusted to given gas turbine plants.

The combined cycle gas turbines 12,12' of the gas power plant may be of any standard type, the only possible exception being that the common combustor 10 may be modified compared with a standard combustor. It may be possible to modify different types of combustors, such as for example, but not limiting to, external combustors, silo type combustors or canned type combustors. In addition the integrated $CO_2$ capture plant 11 may be of the $CO_2$ membrane type, for example of the polymer type, and may be modified in order to obtain feasible and cost effective solutions.

Captured $CO_2$ and possible nitrogen escaped through the $CO_2$ membrane may be removed from the $CO_2$ capture plant and for example be pumped back to the oil well in order to increase the oil production from the well (IOR=Increased Oil Recovery) or to a deposit plant of any suitable type.

Figure 4:
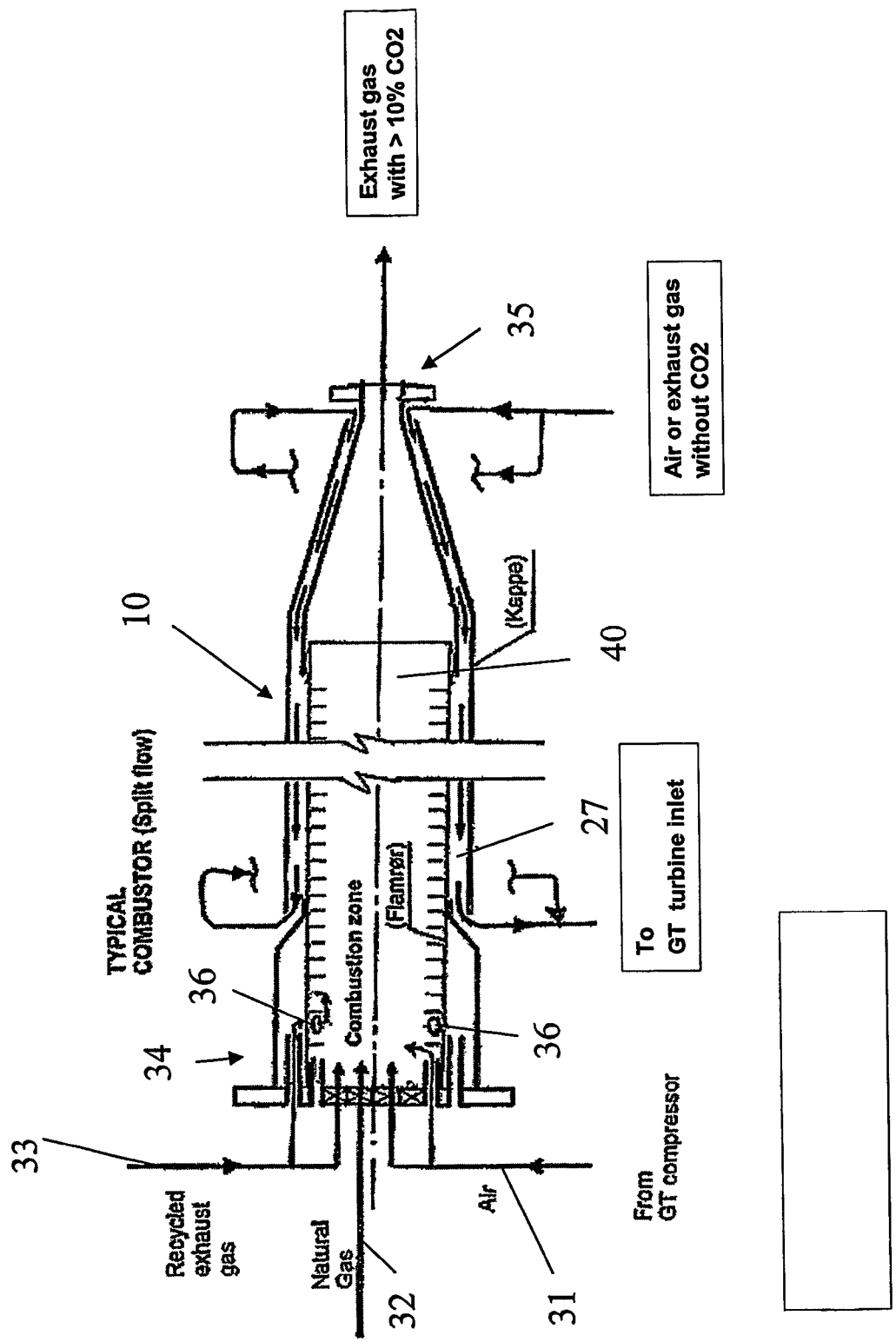
FIG. 4 shows details of a preferred embodiment of the combustor applied in the combustor plant.

Reference is made to FIG. 4 showing details of a preferred embodiment of a combustor 10 according to the invention. The combustor comprises a flame tube 40 and a surrounding casing or jacket 27. According to the process shown in FIGS. 1-3 a standard combustor 10 is used, modified to cater for the air management system according to the invention. The constructive solution of one embodiment of such standard combustor or combustion chamber may be found in available literature, textbooks and publications. It should be appreciated, however, that such standard combustor is commonly used in a different way since air commonly is circulated around the flame tube 40, between the jacket 27 and the flame tube 40, and then fed into the flame tube 40 at the combustion zone of the combustor.

According to the present invention the air management is different, since the combustor 10 is working primarily with to separate gas streams, one flowing internally through the flame tube 40 and the other flowing outside the flame tube 40. Only the gas stream passing within the interior of the flame tube 40 is fed to the $CO_2$ capture plant 11.

Compressed air from the compressor 13, natural gas and re-circulated flue gas from the combustor is fed into the flame tube 40 at one end 34 through the air supply pipe 31, the natural gas supply pipe 32 and the re-circulation pipe 33 for flue gas. The combusted flue gas leaves the burner 10 at its opposite end 35.

The cleaned flue gas is fed into the jacket 27 at the outlet end 35 of the combustor and circulated around the flame tube 40 at its exterior surface in order to cool down the flame tube, whereupon the cleaned flue gas leaves the jacket 27 in the area of the combustion zone of the flame tube 40. In such way the combustion in the combustor 10 may occur at optimal combustion temperature and air surplus in order to meet the requirements for a sufficiently low $NO_x$ discharge.

The combustor 10 according to the invention comprises thus a combination of a combustor and a heat exchanger. Hence, the combustion in the combustor 10 may occur at an optimal combustion temperature and with air surplus in order to meet the requirement of a sufficiently low $NO_x$ discharge.

Although a plant using one single combustor is described, it should be appreciated that several combustors may be used. Further it should be appreciated that the combustor is shown schematically and further elements apparent for a person skilled in the art is incorporated but not shown or described. Examples of such omissions may inter alia be the pressure casing surrounding the combustor.

According to the embodiments shown and described above the $CO_2$ capture plant may for example be of the polymer type, and in particular a polymer membrane comprising cellulose acetate. Such types of membranes are both well proven and inexpensive in purchase and use, but have inherent limitations with respect to selectivity, since relatively larger volumes of nitrogen and oxygen may in addition to $CO_2$ escape through the membrane. It may, however, be feasible to use new types of polymer membranes for $CO_2$ capture without deviating from the inventive idea. Such new polymer membrane may make it feasible to employ higher inlet temperatures and thus reduce the need for gas-gas heat exchangers.

The invention claimed is:

1. Method for increasing energy and cost efficiency of a combined cycle gas turbine power plant and for energy and cost effective $CO_2$ capture from a pressurized $CO_2$ enriched flue gas, the method comprising:
   at least one of providing and operating a gas turbine power plant comprising one or more gas turbine plants and/or a combined plant of steam and gas turbine cycles, comprising one or more compressor units and one or more turbines and further comprising a combustor;
   cooling flue gas from the combustor and passing the flue gas through a cleaning unit, the method further including removing at least substantial portions of $CO_2$ content from the flue gas to obtain cleaned flue gas and reheating the cleaned flue gas and, together with pressurized steams, driving the one or more turbines, and depressurizing the steam prior to being discharged to atmosphere; and
   operating the combustor such that the combustor is working with two completely separate gas part streams, one of the two gas part streams being kept completely isolated from the innards of a flame tube of the combustor, wherein a first gas part stream is directed internally in the flame tube of the combustor and wherein a second gas part stream passes along an exterior of the flame tube, the first gas part stream comprising additional air and re-circulated un-cleaned flue gas from the combustor which is combusted together with fuel inside the flame tube, and the second gas part stream comprising cleaned flue gas which is heated by the exterior of the flame tube while the flame tube is being cooled.

2. Method according to claim 1, wherein the method further comprises:
   at least one of operating and providing the power plant such that the power plant has a first gas turbine and a second gas turbine, each having a respective compressor unit and a respective turbine unit, the un-cleaned flue gas from the combustor being compressed in the compressor unit of the second gas turbine, the second gas part stream being cleaned and used for heat exchange in the combustor in order to obtain optimal heating of the second gas part stream in the combustor; and
   transferring the heat energy at a highest possible temperature and wherein the cleaned gas part stream then is fed to an inlet of the turbine unit of the first gas turbine for driving said first gas turbine plant.

3. Method according to claim 1, wherein a pressurized part of the flue gas to be cleaned is led through a $CO_2$ capture unit in order to remove $CO_2$ from the flue gas.

4. Method according to claim 1, wherein steam is injected in the second gas part stream before the inlet of a jacket surrounding the flame tube of the combustor, in order to compensate for removed $CO_2$ in a $CO_2$ capture unit and in order to enhance heat transfer in the combustor.

5. Method according to claim 4, wherein the second gas part stream having traveled from the compressor is fed into the jacket at an exit of the combustor and exits the jacket in an area of the combustion zone of the combustor.

6. Method according to claim 1, wherein the first gas part stream having travelled from the compressor unit is re-circulated back to the flame tube together with pressurized air and fuel.

7. Method according to claim 1, wherein flue gas pressure is increased after expansion and cooling and wherein a portion of the first gas part stream is re-circulated back to the combustor in order to optimize enrichment of $CO_2$ prior to entering a $CO_2$ capture unit.

8. Method according to claim 1, wherein water is removed from the flue gas in front of a booster, pressurizing the flue gas, whereupon water is added again after passing through the booster, thereby regulating a mole weight of flue gas at the inlet to a compressor.

9. Method according to claim 1, wherein the flue gas is fed through a heat recovery steam generator for production of steam, wherein at least a portion of the produced steam is fed back to the second gas stream in front of a jacket of the combustor.

10. Method according to claim 9, wherein the remaining parts of the produced steam drive one or more steam turbines.

11. Method according to claim 1, wherein one part of the flue gas is fed via a heat exchanger to the $CO_2$ capture plant whereupon the cleaned flue gas is returned back via the heat exchanger where it is reheated and mixed with steam and additional air from a compressor unit, forming the second gas part stream flowing along the exterior of the flame tube.

12. Method according to claim 1, wherein a first and second gas turbine plant, being coupled in series, are used and having one or more common combustors, the method including heating gas at an exterior of the flame tube and feeding the heated gas through a unit for adding heat, and feeding the heated gas to the turbine unit of the first gas turbine plant, and the flue gas formed in the flame tube is fed to the turbine unit of the second gas turbine plant, whereupon the flue gas is fed to a heat recovery steam generator where the flue gas is cooled and thereafter led via a water cooler to the inlet of a compressor of the second gas turbine plant where the flue gas is compressed and split into two flue gas part streams.

13. Method according to claim 12, wherein one flue gas stream is led via a heat exchanger to a $CO_2$ capture plant whereupon the cleaned flue gas is fed back via the heat exchanger where the flue gas is reheated and then mixed with steam and thereafter circulated around the exterior of the flame tube.

14. A method of operating a power plant, the method comprising:
   operating a first combined cycle gas turbine power plant, wherein the action of operating the first combined cycle gas turbine power plant includes:
      directing a first gas stream into a flame tube of a combustor of the plant and combusting the first gas stream with fuel inside the flame tube to produce flue gas, the first gas stream including additional air and re-circulated un-cleaned flue gas;
      directing a second gas stream that includes a portion of the produced flue gas from the combustor through a cleaning unit and cleaning the flue gas, wherein the action of cleaning the flue gas includes removing $CO_2$ from the flue gas, to obtain cleaned flue gas;
      directing the second gas stream about an exterior of the flame tube of the combustor while the first gas stream is being directed into the flame tube, wherein the second gas stream is completely separate from the first gas stream and is kept completely isolated from the interior of the flame tube, the action of directing the second gas stream about the exterior of the flame tube resulting in heat transfer from the first gas stream to the second gas stream, through the flame tube; and driving one or more turbines utilizing, at least in part, the cleaned flue gas.

15. Method according to claim 14, wherein the method includes simultaneously operating a second combined cycle gas turbine power plant which is connected to the first combined cycle gas turbine power plant, the second combined gas turbine plant being driven by the un-cleaned flue gas while the first combined cycle gas turbine power plant is driven by the cleaned flue gas.

16. Method according to claim 14, wherein the action of directing a portion of the flue gas to the cleaning unit includes directing the portion of the flue gas to the cleaning unit such that the flue gas has, upon entry into the cleaning unit, a pressure of at least 15 bar and a content of $CO_2$ exceeding 10%.

17. Method according to claim 14, wherein a temperature of the flue gas, upon leaving the combustor, is about 1200-1400° C.

18. Method according to claim 14, wherein a temperature of the flue gas, upon leaving the combustor, is about 1200-1400° C.

19. Method according to claim 14, wherein the combustor operates as a heat exchanger to cool the flue gas.

20. Method according to claim 15, wherein the first and second combined cycle gas turbine power plants are coupled in series and share at least one common combustor, the method further including:

heating gas at an exterior of the flame tube and feeding the heated gas through a unit to add thermal energy to the gas, thereby obtaining heated gas;

feeding the heated gas to a turbine unit of the first combined cycle gas turbine power plant;

feeding the flue gas formed in the flame tube being to a turbine unit of the second combined cycle gas turbine plant; and feeding the flue gas from the turbine unit of the second combined cycle gas turbine plant to a heat recovery steam generator where the flue gas is cooled and thereafter led via a water cooler to the inlet of a compressor of the second combined cycle gas turbine plant where the flue gas is compressed and split into two the two completely separate gas part streams.

* * * * *